Patented May 14, 1929.

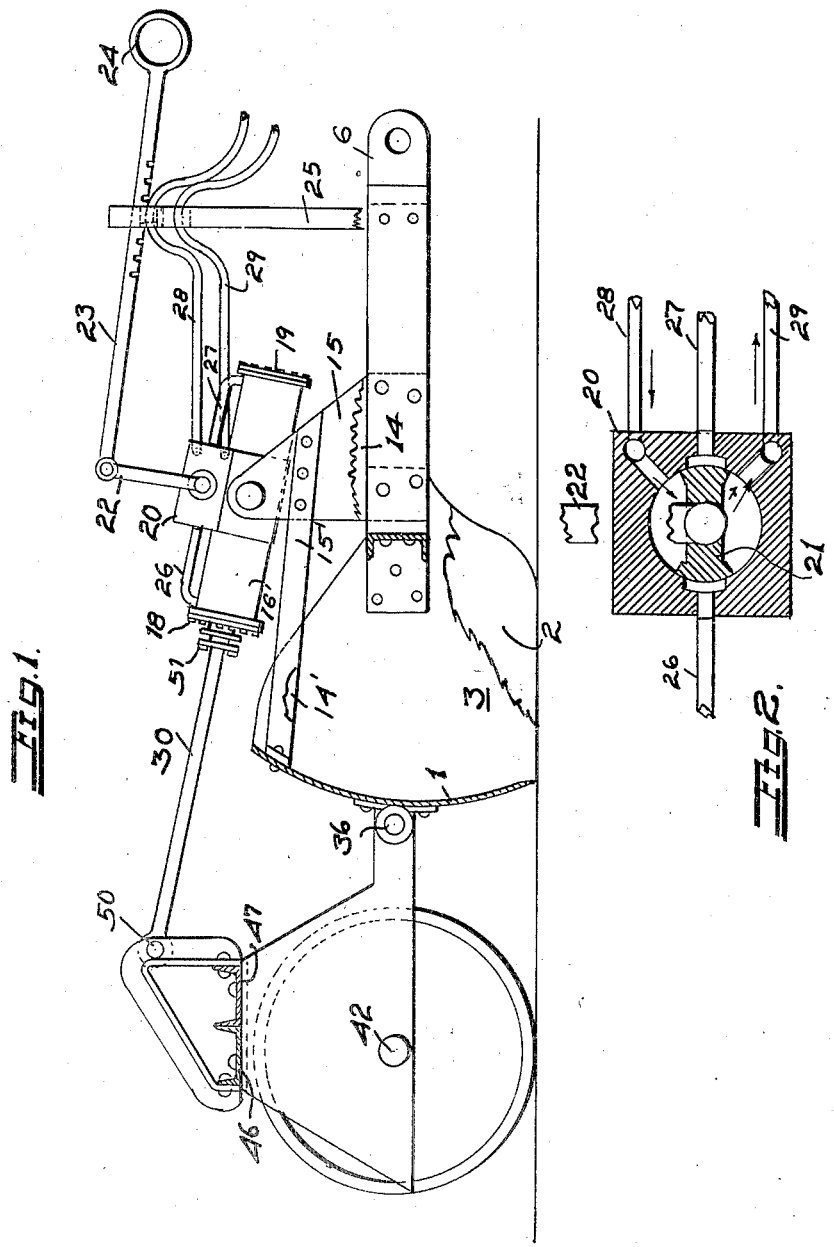

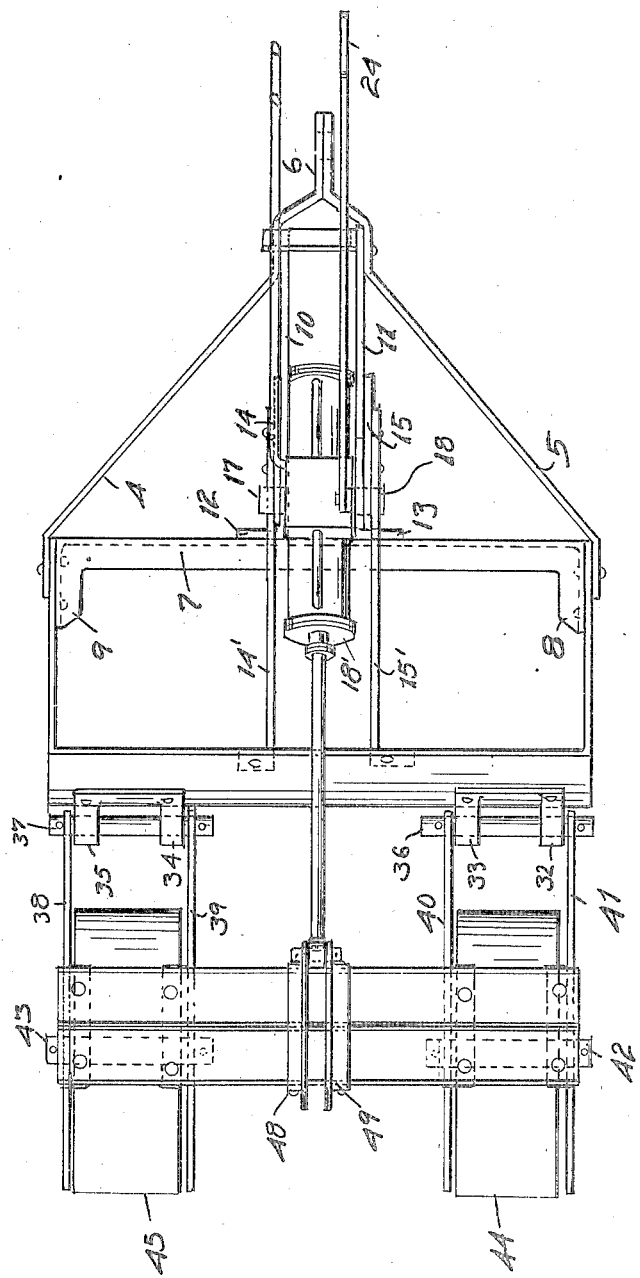

1,713,048

UNITED STATES PATENT OFFICE.

WESLEY KENNETH McMILLAN, OF SAN FRANCISCO, CALIFORNIA, ASSIGNOR TO AMERICAN TRACTOR EQUIPMENT COMPANY, OF OAKLAND, CALIFORNIA, A CORPORATION OF CALIFORNIA.

WHEELED LIFTING SCRAPER.

Application filed December 27, 1926. Serial No. 157,337.

This invention relates to a machine for leveling ground as in preparing ground for irrigation or in handling road work where the surface of the ground at the edge of a road must be leveled or for preparing roadways for the reception of the top surface.

An object of the invention is to provide means whereby the scraper used may be raised or lowered at will, and a quantity of earth either gathered up or spread as may be desired.

Another object of the invention is to provide means whereby power may be made use of to raise and lower the scraper.

Other objects of the invention will be apparent as the description proceeds.

An embodiment of the invention is shown in the accompanying drawings in which the same reference numeral is applied to the same portion throughout the several figures of the drawings and of which there may be modifications.

Figure 1 is a side elevation of the scraper with the scraper shown in its formal operating position, Figure 2 is a sectional view of the valve used on the power cylinder to raise or lower the scraper, Figure 3 is a plan view of the complete scraper with the wheels and scraper shown in substantially the same position as is shown in Figure 1.

The scraper proper consists of a heavy sheet of steel indicated at 1 which sheet of steel has the two side plates 2 and 3, which plates are in turn connected to two heavy channel bars 4 and 5 which are brought together at the front to form a single draw bar 6.

In order to give the draw bar frame and scraper greater rigidity there is a heavy channel bar 7 with its ends turned back as indicated at 8 and 9 connected to the inside of the two members 2 and 3. Flat bars 10 and 11 are connected from the front end of the draw bar to the center of the cross-bar 7 by means of the outwardly turned ends 12 and 13 to give the frame greater strength. Plates 14 and 15 are supported on the plates 10 and 11 to carry the power cylinder 16, said cylinder having two trunnions 17 and 18 journaled in the two braces 14 and 15.

The power cylinder has the detachable heads 18 and 19 and on its upper side it has a housing 20 within which a two-way valve 21 is movable. The valve 21 has the operating arm 22 and this arm is in turn connected to a link 23 which has a handle 24 at its front end extending into a convenient place for the workman driving the tractor to operate it.

The handle rod 23 is supported by a standard 25 in a substantially fixed position for the workman to operate. Pipes 26, 27 afford means to distribute the fluid from the valve to opposite ends of the cylinder and the pipes 28, 29, serve to permit the fluid to be pumped from the tractor to the scraper cylinder, the direction of movement of the piston rod 30 being varied in accordance with the position of the operating handle 22.

Secured on the back of the scraper 1 are four boxes 32, 33, 34 and 35 which boxes provide journal bearings for two pins 36, 37. The pins 36 and 37 provide pivot points for the plates 38 to 41 inclusive, which plates are in turn supported by the shafts 42 and 43 forming the axle of the two rollers 44 and 45. The four plates 38 to 41 inclusive, are connected together at their top by means of two heavy channel bars 46 and 47 and at their center these channel bars are in turn connected together by two angle frames 48 and 49 to which the rear end of the piston rod 30 is connected as indicated at 50. A suitable packing box 51 prevents the leakage of liquids from the piston 16 whenever the pressure of the liquid used therein is applied on that end of the cylinder 16 the operation of the scraper is as follows: Assuming it to be connected at the draw bar 6 with any draw bar of the ordinary tractor the handle 24 is within reach of the operator of the tractor who stands on a platform carried thereby. The flexible pipes 28 and 29 are connected respectively with a suitable pump and with the pump ply, but which pump forms no part of the present invention. When the workman on the tractor desires to cause the scraper 1 to dig deeper into the ground he will push the handle 23 in such a direction that the pump will deliver water or other fluid through the pipe 26 into the rear end of the cylinder 16, this will pull the cylinder closer to the frames 48 and 49 and will cause the front end of the frames to push downwardly upon the two pins 36 and 37, thereby causing the scraper to dig deeper into the ground.

If the reverse action takes place the handle 23 will be shifted so that the pump will deliver the fluid through the pipe 28 to the gear end of the cylinder 16, that is against the head 19 and the result will be that the cylinder will be separated in distance from the frame members 48 and 49 and thereby the pins 36 and 37 will have pressure applied to them from the bottom tending to lift the scraper 1 off the ground. It will thus be seen that this construction provides an extremely flexible scraper with all capabilities of being forced into the ground or lifted off the ground that are ordinarily present for a four wheel scraper which is entirely supported by the frame or operated by a series of adjustments with the front and rear of the four wheel supported frame.

Another advantage of this construction is that it enables the scraper to be coupled to the tractor by merely placing a pin through the draw bar at 6.

The plates 14 and 15 are braced against the top of the surface board 1 by means of two heavy bars 14' and 15'.

Having thus described my invention, what I desire to secure by Letters Patent of the United States is as follows, but modifications may be made in carrying out the invention as shown in the drawing and in the above particularly described form thereof, within the purview of the annexed claims.

1. A scraper of the class described comprising a scraper, a draw-bar for connecting it to a tractor, a truck pivotally connected to said scraper, a cylinder pivotally mounted on said scraper, said cylinder having a piston, and piston rod, a bracket on said truck to which said piston is connected whereby when power is applied to said cylinder the lower edge of said scraper may be raised or lowered depending on to which end of the cylinder the power is applied.

2. A scraper of the class described comprising a scraper adapted to be drawn by a tractor, a truck frame, its forward end pivoted for vertical radial movement to the back of said scraper, and reversible power means mounted on said scraper and connecting said scraper and said truck for tilting up or down the forward end of the truck frame and the back portion of the scraper.

In testimony whereof I have hereunto set my hand this 2d day of December, A. D. 1925.

WESLEY KENNETH McMILLAN.